United States Patent Office 3,195,386
Patented July 20, 1965

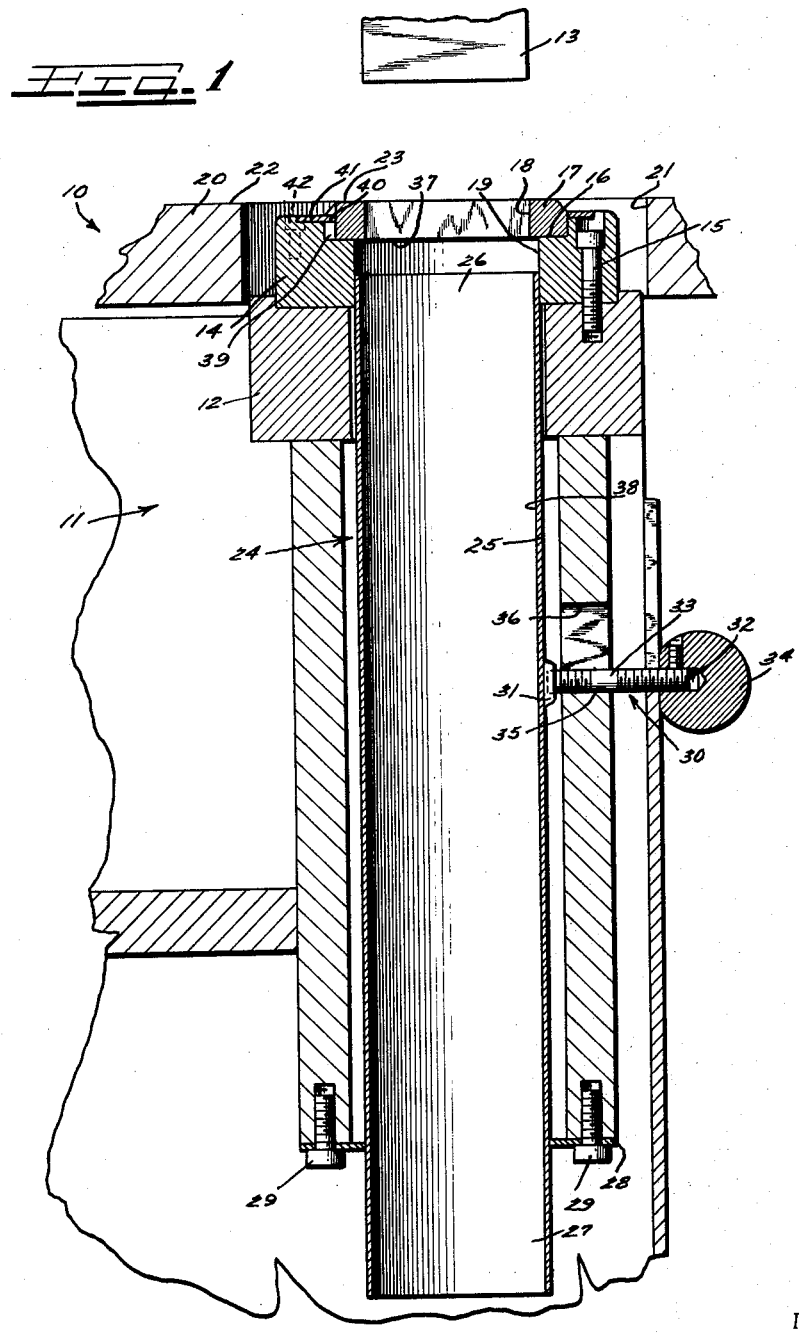

3,195,386
PUNCHING MACHINE HAVING TOOL EJECTOR
Dennis Daniels, Williamsville, N.Y., assignor to Houdaille Industries, Inc., Buffalo, N.Y., a corporation of Michigan
Filed Nov. 2, 1962, Ser. No. 234,945
7 Claims. (Cl. 83—162)

This invention relates generally to punching machines, and more specifically to an improved tool ejector mechanism incorporated therein.

Although the principles of the present invention may be included in various punching machines, a particularly useful application is made in a punching machine of the type which is constructed to employ interchangeable punches and dies which are frequently substituted and replaced by the operator, such as after one or after a small number of operations. When a punching machine is provided with a table to support the workpiece so that the lower surface of the workpiece is substantially coplanar with the upper surface of the lower tool, such as the upper surface of the die, it frequently is inconvenient to remove the die, which die is then disposed substantially flush with the adjacent supporting surface.

The present invention contemplates the provision of an ejection mechanism for raising the die, or lower tool, thereby facilitating grasping of the same. If the workpiece is then resting on the upper surface of the lower tool, actuation of such mechanism also raises the workpiece to facilitate grasping thereof. In a preferred embodiment, the ejection mechanism includes a tubular ejection member which also serves as a slug chute to receive and direct the slugs produced by the punch and die.

Accordingly, it is an object of the present invention to provide an improved punching machine having a novel tool ejector structure incorporated therein.

Another object of the present invention is to provide a tool ejection structure.

Yet another object of the present invention is to provide a structure by which a flat workpiece may be raised from a table on which it is supported.

A still further object of the present invention is to provide a tool ejection mechanism for a punching machine, which ejection mechanism also comprises a slug chute.

Many other advantages, features and additional objects of the present invention will become manifest to those versed in the art upon making reference to the detailed description and the accompanying drawing sheet in which a preferred structural embodiment incorporating the principles of the present invention is shown way of illustrative example.

On the drawing:
FIGURE 1 is a fragmentary cross-sectional view of a punching machine assembly equipped with a tool ejection mechanism provided in accordance with the principles of the present invention.

As shown on the drawing:
The principles of this invention are particularly useful when embodied in a punching machine such as fragmentarily illustrated in FIGURE 1, generally indicated by the numeral 10. The punching machine 10 includes a frame generally indicated at all, the frame 11 including a bed 12 which preferably is welded to the other frame components. The punching machine 10 includes a ram-driven movable tool 13, here comprising a punch, the punch being reciprocably carried on the frame 11 and reciprocably driven by structure of a known type (not shown).

Immediately above the bed 12, there is provided an annular tool-receiving and supporting member 14 which is secured to the bed 12 by a number of screws such as 15.

The annular supporting member 14 is provided with an upwardly directed recess 16 in which there is slidably received a normally fixed tool 17. In this embodiment, the tool 17 comprises an annular die which has a die opening 18 which is smaller than the opening 19 in the annular supporting member 14.

The punching machine 10 further includes a table 20 having an opening 21 through which the supporting member 14 and the die 17 project. The upper surface 22 of the table 20 is substantially coplanar with the upper surface 23 of the die 17 so that a flat workpiece may be supported thereon when it is to be punched by coaction of the punch 13 and the die 17.

When the punching has been completed, the workpiece (not shown) may be elevated slightly above the surface 22 of the table 20 by operation of the ejection structure described below. Doing so facilitates grasping of the workpiece for movement or removal. When use of the lower tool or die 17 has been completed, the ejection mechanism described in the following paragraph may be employed to slide the die or other tool 17 out of the recess 16 to facilitate the grasping thereof.

To this end, there is provided an ejection mechanism generally indicated at 24 which is a manually movable or selectively actuatable means. The ejection means 24 includes an elongated tubular ejection member 25 having an upper end 26 which is slidably guided at its outer periphery in the opening 19 of the supporting member 14, and having a lower end 27 which is slidably guided at its outer periphery by a guide plate 28 secured by screws 29 to the frame 11, and forming in effect a part thereof. The ejection means 24 further includes an actuator arm 30 having a rigid threaded connection at one end 31 to an intermediate portion of the tubular member 25, having an externally accessible outer end 32, and an intermediate portion 33. A manual knob 34 is secured to the outer end 32 of the arm 30, and the intermediate portion 33 is alternatively engageable with a pair of spaced stops 35, 36 forming a part of the frame 11.

The elongated tubular member 25 will ordinarily by gravity or manual positioning be disposed in the illustrated position. This is the lowermost position for the tubular member, it being defined by engagement between the intermediate portion 33 of the actuator arm 30 and the stop 35. When the knob 34 is grasped and raised, the guided tubular member 25 will, at its upper end, abut a lower face 37 of the die 17 and will move into or substantially through the recess 16 to elevate the die 17. To do this, the tubular member 25 has a size which is slightly smaller than the opening 19 and which is larger than the size of the die opening 18. Further, the tubular member 25 has an internal slug passage 38 which is of a size larger than the die opening 18 to enable slugs produced by the punch 13 and the die 17 to pass freely therethrough.

The ejector mechanism 24 therefore may act through the die 17 to elevate the workpiece for grasping thereof, may act on the die 17 to lift the same out of the recess 16, and will also function as a slug chute during normal operation of the punching machine.

Most punching will entail use of a round punch 13 and a die 17 having a round opening 18. However, the punch 13 has been illustrated here as being non-circular to cooperate with a die opening of similar configuration. Where such structure is employed, it is necessary that the die 17 be angularly keyed. To this end, the die 17 is provided with a vertical slot 39 which slidably receives a key portion 40 forming a part of a rotatable indexing ring 41, the indexing ring 41 being clamped by a number of screws such as 42 to angularly lock the die 17 in proper angular alignment with respect to the punch 13. It is therefore noteworthy that the ejection mechanism 24 may be employed with non-circular tooling. Further, even though the die 17 may have a non-circular opening, it nevertheless is slidably removable from the supporting member 14 by the ejector mechanism 24, even though the die may have unlimited angular adjustability.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A punching machine comprising in combination:
   (a) a frame having a fixed bed, said bed having a fixed upwardly-directed surface supporting thereon a normally stationary annular die against any downward movement from its position during a punching operation;
   (b) a vertically movable punch reciprocably carried by said frame, and disposed above and in alignment with said normally stationary die for cooperation therewith; and
   (c) a normally-stationary selectively-actuatable tubular die ejection member freely slidably supported on said frame and having an upper end portion, other than said surface, engageable with a lower side of said normally stationary die for effecting upward movement thereof, said tubular ejection member having an internal size receptive of slugs from said annular die.

2. A punching machine comprising in combination:
   (a) a frame having a fixed bed, said bed having a fixed upwardly-directed surface supporting thereon a normally stationary die against any downward movement from its position during a punching operation;
   (b) a vertically movable punch reciprocably carried by said frame, and disposed above and in alignment with said normally stationary die for cooperation therewith;
   (c) a horizontally directed table having an aperture defined by means separate from and into which said supporting surface of said bed projects, said table being disposed to support a workpiece from below with the lower face of the workpiece in substantially coplanar relation with the upper face of the normally stationary die; and
   (d) a normally-stationary selectively-actuatable tubular die ejection member freely slidably suported on said frame and having an upper end portion, other than said surface, engageable with a lower side of said normally stationary die for effecting upward movement thereof and of the workpiece such that the workpiece will be thereby spaced upwardly from the table, thereby facilitating manual grasping of the workpiece after it has been punched, said tubular ejection member having an internal size receptive of slugs from said annular die.

3. A punching machine comprising in combination:
   (a) a frame having a bed including an annular die-receiving and supporting member fixedly secured thereto, said member having a fixed upwardly directed die-support surface defining the lower end of a recess therein;
   (b) a normally stationary annular die slidably supported in the recess of said member on said fixed die-support surface, said die projecting over the opening in said annular supporting member;
   (c) a punch reciprocably carried by said frame in alignment with said normally stationary die for cooperation therewith;
   (d) a movable tubular die ejection member freely slidable through the opening of said supporting member into engagement with said normally stationary die, the outer periphery of said die ejection member being guided by at least one of said frame and said supporting member, said tubular ejection member having an internal size receptive of slugs from said annular die; and
   (e) an actuator arm secured at one end to said die ejection member and accessible at the other end thereof for manual manipulation thereof.

4. A punching machine comprising in combination:
   (a) a frame having a bed including an annular die-receiving and supporting member fixedly secured thereto, said member having a fixed upwardly directed die-support surface defining the lower end of a recess therein;
   (b) a normally stationary annular die slidably supported in the recess of said member on said fixed die-support surface, said die projecting over the opening in said annular supporting member;
   (c) a punch reciprocably carried by said frame in alignment with said normally stationary die for cooperation therewith;
   (d) a movable tubular die ejection member freely slidable through the opening of said supporting member into engagement with said normally stationary die, the outer periphery of said die ejection member being slidably guided by at least one of said frame and said supporting member, said tubular ejection member having an internal size receptive of slugs from said die;
   (e) a pair of spaced fixed stops on said frame; and
   (f) an actuator arm rigidly secured at one end to said die ejection member and adapted to be manually reciprocated at its other end, an intermediate portion of said arm being alternatively engageable with said stops.

5. A punching machine comprising in combination:
   (a) a frame having a bed including an annular die-receiving and supporting member fixedly secured thereto, said member having a fixed upwardly directed die-support surface defining the lower end of a recess therein;
   (b) a normally stationary annular die slidably supported in the recess of said supporting member on said fixed die-support surface, said die projecting over the opening in said annular supporting member;
   (c) a punch reciprocably carried by said frame in alignment with said normally stationary die for cooperation therewith;
   (d) a movable elongated tubular die ejection member freely slidable through the opening of said supporting member into engagement with said normally stationary die, said die ejection member being guided at the upper end of its outer periphery by said supporting member, and at the lower end of its outer periphery by said frame, said tubular ejection member having an internal size receptive of slugs from said die; and
   (e) an actuator arm secured at one end to said die ejection member and accessible at the other end for manual manipulation thereof.

6. A punching machine comprising in combination:
   (a) a frame having a bed including an annular die-receiving and supporting member fixedly secured thereto, said member having a fixed upwardly directed die-support surface defining the lower end of a recess therein;
   (b) a normally fixed annular die slidably supported in the recess of said supporting member on said fixed die-support surface, said die having a smaller opening than that of said supporting member;
   (c) a punch reciprocably carried by said frame in alignment with said die for cooperation therewith;
   (d) a movable tubular die ejection member freely slidable through the opening of said supporting member into engagement with said die, said die ejection member having a slug passage therethrough of larger cross-sectional size than the opening in said die, said die ejection member being slidably guided at its outer periphery by at least one of said supporting member and said frame; and (e) an actuator arm secured at one end to said die ejection member and accessible at the other end for manual manipulation thereof.

7. A punching machine comprising in combination:

(a) a frame having a bed including an annular die-receiving and supporting member fixedly secured thereto, said member having a fixed upwardly directed die-support surface defining the lower end of a recess therein;

(b) a normally fixed annular die slidably supported in the recess of said supporting member on said fixed die-support surface, said die having a smaller opening than that of said supporting member;

(c) a punch reciprocably carried by said frame in alignment with said die for cooperation therewith;

(d) a movable elongated tubular tool ejection member freely slidable through the opening of said supporting member into engagement with said die, said tool ejection member having a slug passage therethrough of larger cross-sectional size than the opening in said die, said tool ejection member being slidably guided at the upper end of its outer periphery by said supporting member, and at the lower end of its outer periphery by said frame;

(e) a pair of spaced fixed stops on said frame; and (f) an actuator arm rigidly secured at one end to said tool ejection member and adapted to be manually reciprocated at its other end, an intermediate portion of said arm being alternatively engageable with said stops.

References Cited by the Examiner
UNITED STATES PATENTS

| | | | |
|---|---|---|---|
| 1,057,523 | 4/13 | Brown | 83—658 X |
| 1,431,541 | 10/22 | Randall | 83—641 |
| 2,315,586 | 4/43 | Bouget | 83—640 |
| 2,355,344 | 8/44 | Wales | 83—641 |
| 2,386,652 | 10/45 | Borg | 83—699 |
| 3,029,677 | 4/62 | Metzger | 83—640 |

ANDREW R. JUHASZ, *Primary Examiner.*

HUNTER C. BOURNE, JR., *Examiner.*